United States Patent
Xu

(10) Patent No.: US 8,243,120 B2
(45) Date of Patent: Aug. 14, 2012

(54) METHOD AND DEVICE FOR REALIZING PRIVATE SESSION IN MULTIPOINT CONFERENCE

(75) Inventor: Fugang Xu, Shenzhen (CN)

(73) Assignee: Huwei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 12/563,820

(22) Filed: Sep. 21, 2009

(65) Prior Publication Data

US 2010/0073457 A1 Mar. 25, 2010

Related U.S. Application Data

(63) Continuation of application No. PCT/CN2008/070238, filed on Feb. 1, 2008.

(30) Foreign Application Priority Data

Mar. 21, 2007 (CN) .......................... 2007 1 0087285

(51) Int. Cl.
*H04N 7/14* (2006.01)

(52) U.S. Cl. ................ 348/14.09; 348/14.08; 348/14.12

(58) Field of Classification Search .... 348/14.01–14.16; 370/260, 261; 709/203–204
See application file for complete search history.

(56) References Cited

U.S. PATENT DOCUMENTS

| 6,178,237 | B1 | 1/2001 | Horn | |
| 7,213,050 | B1 * | 5/2007 | Shaffer et al. | 709/204 |
| 2002/0188731 | A1 | 12/2002 | Potekhin et al. | |
| 2003/0035527 | A1 | 2/2003 | Baker | |
| 2003/0182374 | A1 | 9/2003 | Haldar | |
| 2005/0078613 | A1 | 4/2005 | Covell et al. | |
| 2006/0164507 | A1 * | 7/2006 | Eshkoli et al. | 348/14.09 |
| 2007/0165669 | A1 | 7/2007 | Kasperovich | |

FOREIGN PATENT DOCUMENTS

| CN | 1705336 A | 12/2005 |
| CN | 1717040 A | 1/2006 |
| CN | 101022481 A | 8/2007 |
| GB | 2 313 251 A | 11/1997 |
| JP | 2002374509 A | 12/2002 |
| WO | WO 03/036927 A1 | 5/2003 |

OTHER PUBLICATIONS

Rejection Decision issued in Chinese Application No. 200710087285.7 Mailing Date: Mar. 10, 2010, Huawei Technologies Co., Ltd.

First Chinese Office Action issued in Chinese Application No. 200710087285.7 Mailing Date: May 8, 2009, Huawei Technologies Co., Ltd.

(Continued)

*Primary Examiner* — Melur Ramakrishnaiah

(74) *Attorney, Agent, or Firm* — Finnegan, Henderson, Farabow, Garrett & Dunner LLP

(57) ABSTRACT

A method for realizing a private session in a multipoint conference is provided. The method includes: establishing, by a multipoint control unit (MCU), a private session according to a private session establishment request carrying private session participant identifiers (IDs) sent by a private session initiator, and sending audio code streams of private session participants corresponding to the private session participant IDs. A device for realizing a private session in a multipoint conference is further provided. Thus, a part of participants can discuss privately while normally listening to the content of the multipoint conference.

13 Claims, 6 Drawing Sheets

OTHER PUBLICATIONS

Notification of Reexamination issued in Chinese Application No. 200710087285.7 Mailing Date: Jun. 23, 2011, Huawei Technologies Co., Ltd.

Extended European Search Report dated (mailed) Apr. 8, 2010, issued in related Application No. 08706615.5-1244, PCT/CN2008070238, Hauwei Technologies Co., Ltd.

Written Opinion of the International Searching Authority (translation) dated (mailed) May 22, 2008, issued in related Application No. PCT/CN2008/070238, filed Feb. 1, 2008, Huawei Technologies Co., Ltd.

Chinese Office Action (translated), dated Dec. 8, 2011, issued in related Chinese Application No. 200710087285.7.

* cited by examiner

METHOD AND DEVICE FOR REALIZING PRIVATE SESSION IN MULTIPOINT CONFERENCE

CROSS-REFERENCE TO RELATED APPLICATIONS

This application is a continuation of International Application No. PCT/CN2008/070238, filed on Feb. 1, 2008, which claims priority to Chinese Patent Application No. 200710087285.7, filed on Mar. 21, 2007, both of which are hereby incorporated by reference in their entireties.

FIELD OF THE TECHNOLOGY

The present invention relates to a multipoint conference technology, and more particularly to a method and a device for realizing a private session in a multipoint conference.

BACKGROUND OF THE INVENTION

Among the current solutions for realizing a multipoint conference, a speaker of the conference cannot receive his/her own voice, but the other participants can hear the speaker.

In a specific implementation, a multipoint conference is realized by using a multipoint control unit (MCU) that serves as a core component. The MCU functions as a switch, but it is different from a switch configured in a common telephone network. The MCU switches image, audio, and data signals, i.e., switches data streams, rather than analog signals.

The MCU processes video signals by direct distribution, processes data signals by broadcasting, and processes audio signals according to the following two circumstances. In the case of only one speaker, the MCU switches an audio signal of the speaker to the other participants. In the case of a plurality of speakers, the MCU mixes audio signals of all the speakers, selects an audio signal with the highest level, and then switches the audio signal to all the other participants except the speaker corresponding to the highest level. Currently, the MCU supports the mixing of voices of at most six speakers. When more than six speakers exist, six speakers with the highest voices, i.e., having the highest levels, are selected from the speakers, and the MCU mixes the six voices and then sends the mixed voices to the participants, so that each participant can receive voices of the other participants except the participant himself/herself.

In the above implementation, after the MCU establishes communication with each participant, code stream channels are respectively opened between the MCU and the participants. Currently, the basic code stream channels include audio code stream channels and video code stream channels. In the code stream channels, code streams are transmitted bi-directionally. The internal audio processing of the MCU is divided into three parts, namely, a decoding part, an audio mixing part, and an encoding part. Code streams of all participants need to be transmitted to the decoding part for being decoded, and then transmitted to the audio mixing part for being mixed. Afterwards, the mixed code streams are transmitted to the encoding part for being encoded, and then, the encoded code streams are sent to corresponding participants. The decoding processing includes calculating a volume, i.e., level, of the audio code stream, and meanwhile generating the code stream for performing the audio mixing. The audio mixing part acquires audio code streams for performing the audio mixing according to the volumes of the code streams. By taking a network structure shown in FIG. 1 as an example, assuming that an MCU in this example supports the mixing of at most three audio code streams, and volumes of audio code streams satisfy A>B>C>D>E, a corresponding relation of audio mixing is shown in Table 1.

TABLE 1

| Participant of voice destination | Participant of voice source | Mixing result |
| --- | --- | --- |
| A | BCDE | BCD |
| B | ACDE | ACD |
| C | ABDE | ABD |
| D | ABCE | ABC |
| E | ABCD | ABC |

The audio mixing part performs the audio mixing on three participants with the highest voices among the participants of audio source according to the corresponding relations listed in Table 1 to generate an audio code stream, and then sends the audio code stream to the encoding part for being encoded. Afterwards, the encoding part encodes the audio code stream to generate an audio code stream for being sent to a voice destination participant and then sends the audio code stream. Finally, the results received by the participants are as follows: A hears voices of BCD, B hears voices of ACD, C hears voices of ABD, D hears voices of ABC, and E hears voices of ABC.

As seen from the above analysis, in the above technology, the audio code streams supported by the MCU are mixed first, and then the mixed audio code streams are sent to all the other conference participants except the participants of the audio code stream sources. As a result, a part of the participants in the conference cannot communicate privately without being known by the other participants. Because the audio code streams for performing the audio mixing are either received by all participants, or received by none of them. Therefore, through the above technology, a part of the participants cannot realize a small-group communication without being received by the other participants and without affecting the original ongoing multipoint conference.

As one improving manner, when a part of the participants intend to have an internal discussion, the conference may be divided into several group meetings, which will be recombined into one conference after the discussion. As shown in FIG. 2, A, B, C, D, and E participate in a conference. During the conference, when a certain issue requires group discussion, the participants A, B, and E are classified into one group, and the participants C and D are classified into the other group. The MCU mixes audio code streams of the participants in the two groups respectively, so that the audio code streams of members in one group are not mixed into the audio code streams of members in the other group, i.e., audio code streams of different groups are mixed respectively. After the group discussion is finished, the two groups are recombined into one conference. During the classification process, A, B, and E are classified into one group meeting, C and D are classified into the other group meeting, and the two group meetings do not affect each other. Voices of one group meeting are not received by the participants of the other group meeting.

Although the above improving manner enables a part of the participants to have an internal discussion, it still fails to achieve a private session without affecting the original multipoint conference, as the original multipoint conference is interrupted due to the internal discussion. Furthermore, in the above solution, different groups cannot know the content discussed by each other. Because the above manner can only be adapted to classify all the participants as a whole into different groups for group discussion, the group classification cannot be performed unless all the participants agree to organize the group discussion, so that a private discussion among a part of the participants still cannot be achieved.

In conclusion, the conventional art cannot realize a private session for a part of participants in a multipoint conference, during which the participants can continue to hear the content of the multipoint conference, and the content of the private session is not sent to those who do not participate in the private session.

SUMMARY OF THE INVENTION

Accordingly, the present invention is directed to a method and a device for realizing a private session in a multipoint conference, which enable a part of participants to discuss privately while normally hearing the content of the multipoint conference.

The present invention is achieved through the following technical solutions.

A method for realizing a private session in a multipoint conference is provided. The method includes the following steps.

An MCU establishes a private session according to a private session establishment request carrying private session participant identifiers (IDs) sent by a private session initiator, and sends audio code streams of private session participants corresponding to the private session participant IDs.

A device for realizing a private session in a multipoint conference is provided. The device includes a receiving module and a control module.

The receiving module is adapted to receive a private session establishment request carrying private session participant IDs sent by a private session initiator, and resolve the received private session establishment request.

The control module is adapted to establish a private session according to the private session establishment request resolved by the receiving module, and send audio code streams of private session participants corresponding to the private session participant IDs.

In the present invention, the MCU establishes a private session according to a private session establishment request sent by a private session initiator, and sends audio code streams of private session participants corresponding to private session participant IDs. Therefore, the private session participants are enabled to hold a private session while normally hearing the content of the original multipoint conference and the content of the private session cannot be heard by those who do not participate in the private session.

DETAILED DESCRIPTION OF THE EMBODIMENTS

The embodiments of the present invention are mainly characterized in that, an MCU establishes a private session according to a private session establishment request carrying private session participant IDs sent by a private session initiator, and sends audio code streams of private session participants corresponding to the private session participant IDs.

In order to make the objectives, technical solutions, and advantages of the present invention comprehensible, the present invention is further described in detail below with reference to embodiments and accompanying drawings.

Figure 1:
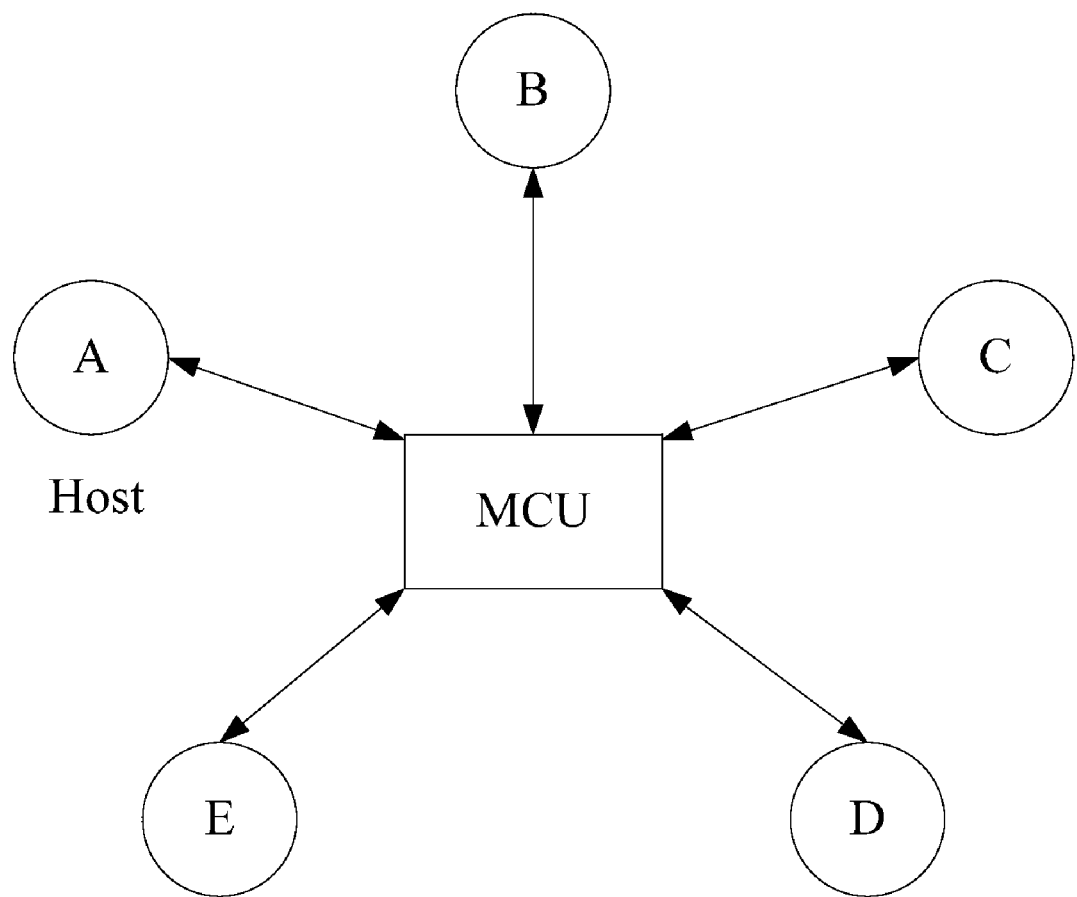
FIG. 1 is a structural view of a network for realizing a multipoint conference in the conventional art.
Figure 2:
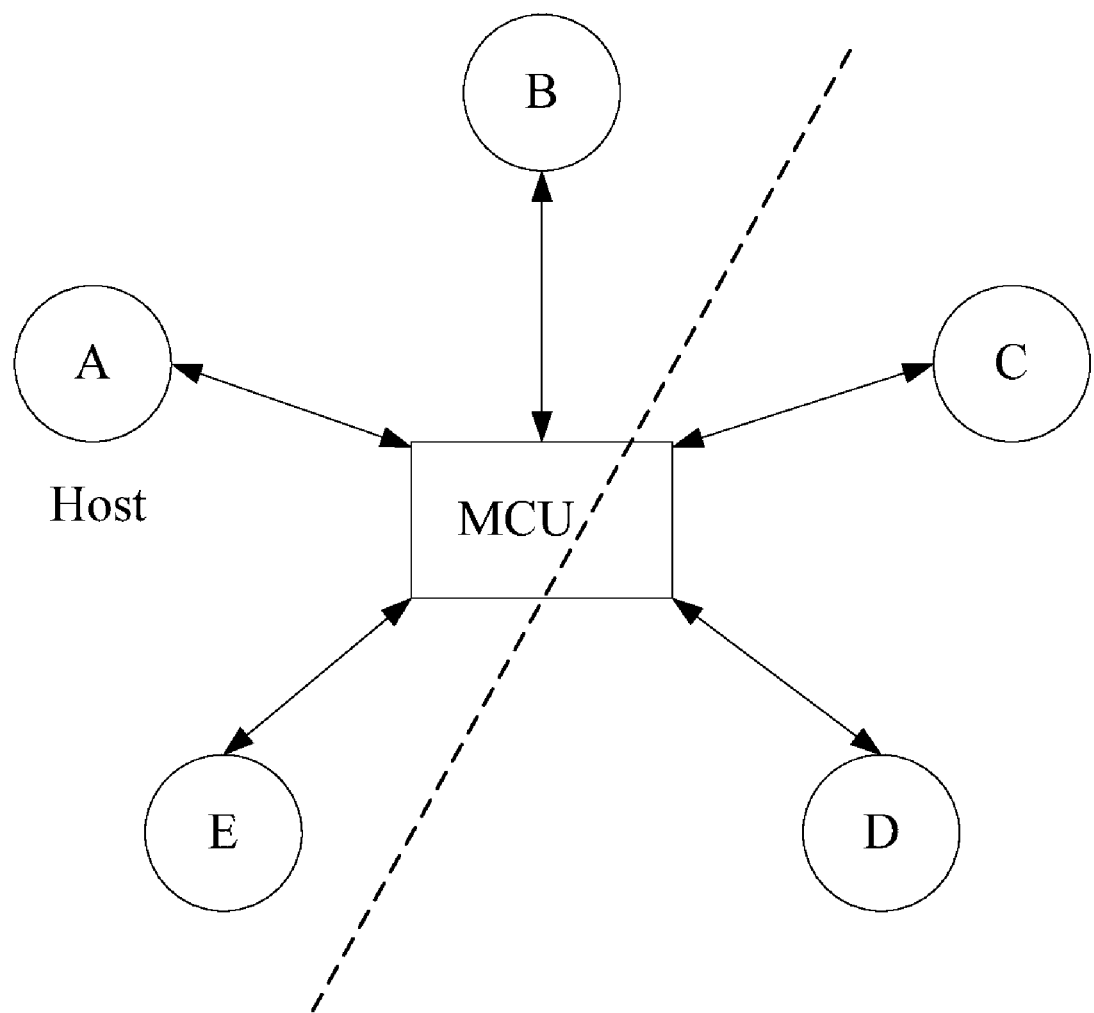
FIG. 2 is a schematic view of a principle of realizing an internal discussion in a multipoint conference in the conventional art.
Figure 3:
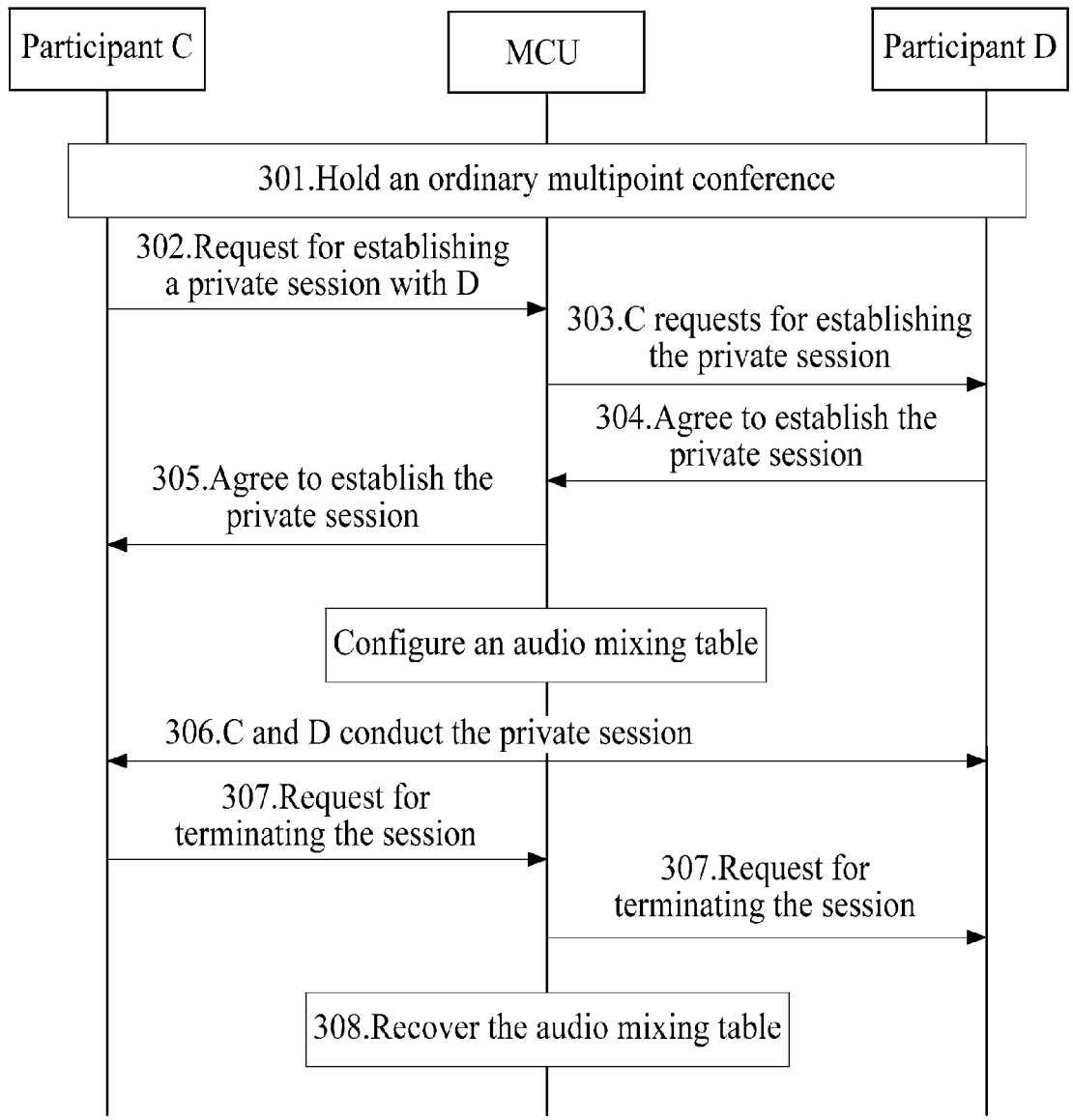
FIG. 3 is a flow chart of a method for realizing a private session through audio mixing according to an embodiment of the present invention.

FIG. 3 is a flow chart of a method for realizing a private session through audio mixing according to an embodiment of the present invention. In this embodiment, the descriptions are given based on a topological structure of a conference as shown in FIG. 1, i.e., five participants A, B, C, D, and E are included. Here, A is a host of the conference. If it intends to establish a session between the participants C and D, the following steps are performed.

In Step 301, an ordinary multipoint conference is held. The multipoint conference is implemented in the same way as that of the conventional art, and an audio mixing table is as shown in Table 1.

In Step 302, a private session establishment request sent by the participant C is sent to the MCU via a corresponding conference terminal.

In this step, the participant C intends to have a private session with D considering a certain relevant issue of the conference, and C sends a private session establishment request to the MCU via a corresponding conference terminal thereof. The request may carry private session participant IDs, i.e., IDs of the participants C and D in this embodiment; a session type of the session to be established; and a session ID. In this embodiment, the participants C and D are involved in two sessions, one is the ongoing multipoint conference, the other is the private session to be established, and different sessions are distinguished by different session IDs.

In Step 303, the MCU forwards the request to the participant D to query whether D supports the establishment of the private session with C or not.

In this embodiment, before the MCU forwards the request to the participant D, the MCU records the session type, the session ID, and the private session participant IDs carried in the private session establishment request. Afterwards, the MCU forwards the request to the participant D according to the private session participant IDs. In this case, the forwarded request may carry the ID of the participant C, the session type of the session to be established, and the session ID. In this embodiment, the session type is a private session.

In Step 304, the participant D selects whether to agree to establish the private session or not.

In this step, a conference terminal of the participant D receives the forwarded request message, parses the content of the request message, and presents to the participant D the ID of the participant C who initiates the private session and the session type carried in the request message in an application layer; and the participant D selects whether to agree to establish the session or not through a dialog box or a window. In this embodiment, assuming that D agrees to establish the private session with C, the conference terminal of the participant D returns a response message about agreeing to establish the private session to the MCU. The response message may carry the ID of the participant D, a session type and a session ID of the session agreed to be established, and an ID of a receiver of the response message, i.e., the ID of the participant C.

In Step 305, the MCU receives the response message, forwards the response message to the conference terminal of the participant C, and configures an audio mixing table.

The configured audio mixing table is an audio mixing table obtained by exclusively mixing audio code streams of the private session participants. The audio mixing table may be configured in the following manners.

Figure 4:
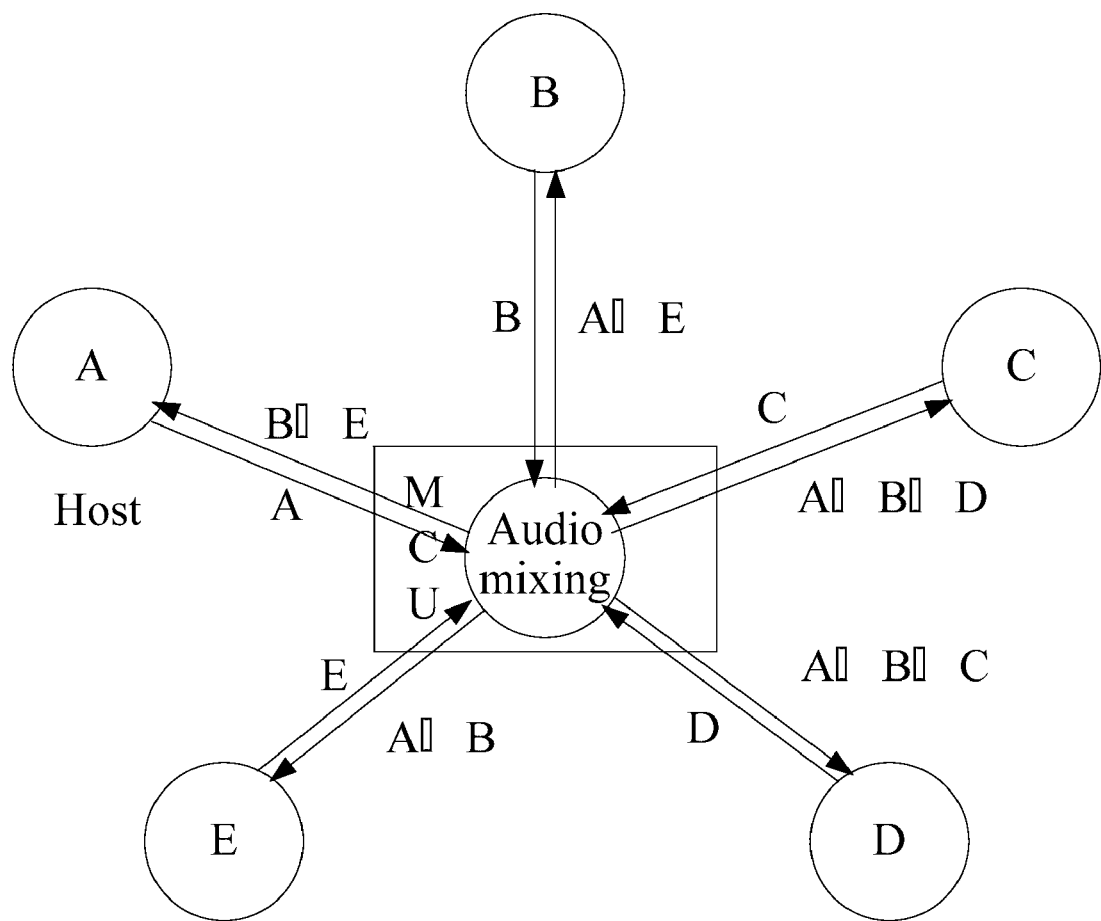
FIG. 4 is a schematic view of a principle of audio mixing according to an embodiment of the present invention.

The principle of audio mixing after the private session is established is as shown in FIG. 4. Particularly, voices of C and D are mixed on the basis of a session to which the original multipoint conference belongs, i.e., the voice of D is mixed into the audio code streams to be sent to C, and the voice of C is mixed into the audio code streams to be sent to D. As a result, C and D not only can hear the speech in the multipoint conference, but also can hear the voices of the counterparts in the private session. However, during the private session, the other participants except the private session participants can still hear the speech in the multipoint conference, but cannot hear the voices of C and D.

For example, the participants A, B, and E in the multipoint conference are having a discussion, and meanwhile, C and D in the private session are having a private conversation. The MCU supports the audio mixing of at most three parties. And the audio mixing table configured by the MCU is as shown in Table 2.

TABLE 2

| Participant of voice destination | Participant of voice source | Mixing result |
|---|---|---|
| A | BE | BE |
| B | AE | AE |
| C | ABDE | ABD |
| D | ABCE | ABC |
| E | AB | AB |

This embodiment may be further extended. Priority levels are preset for all the participants. As the number of speakers in the entire conference increases after the private session is introduced, if the number of speakers exceeds the number of parties at most supported by the MCU in the audio mixing, the MCU filters off a voice of a speaker with a lower volume during the audio mixing. Taking Table 2 as an example, assuming that the MCU merely supports the audio mixing of two audio code streams and both A and B are speaking with a loud voice, C and D can only hear voices of A and B, but cannot hear the voices of the counterparts, even though the private session has been successfully established between C and D. In order to solve this problem, priority levels may be preset for all the participants, for example, the highest priority level is set for the conference host and major conference speakers as well as private session speakers, and a lower priority level is set for the other participants. In such a manner, during the audio mixing, the MCU may mix voices of speakers with high priority levels and filter off audio code streams of participants with a low priority level according to the preset priority levels.

In Step 306, the private session participants C and D conduct a session.

In this step, the MCU performs audio mixing based on Table 2, encodes the mixed audio code streams, and sends the encoded audio code streams to a receiver, so that the private session participants C and D conduct the session.

If a private session participant intends to terminate the private session, the following steps are performed.

In Step 307, assuming that the participant C intends to terminate the private session, the participant C sends a request message for terminating the private session to the MCU.

In this step, the request message may carry IDs of participants of the private session to be terminated, i.e., IDs of the participants C and D, and the session ID of the private session to be terminated.

In Step 308, the MCU receives the request message for terminating the private session, forwards the request message to the participant D, and meanwhile recovers the audio mixing table, so as to use the audio mixing table when the private session is not established.

In this embodiment, the termination of the private session is initiated by the participant who establishes the private session. However, in practical applications, any private session participant may terminate the session at any time. In addition, the manner of terminating the session is not limited to terminating the session immediately once someone initiates to terminate the private session, but the session may be terminated after all the private session participants agree to terminate the session and return a confirmation message for terminating the session respectively.

This embodiment may also be further extended. For example, this embodiment is not limited to establishing one private session in a multipoint conference, but a plurality of private sessions may be established among the conference participants, and each session has a unique ID, so that the participants may discuss different issues.

The above embodiment enables participants of a multipoint conference to establish a private session and conduct the private session while normally hearing the content of the original multipoint conference, and the content of the private session cannot be heard by those who do not participate in the private session. By extending this embodiment, the audio mixing is further performed according to preset priority levels of speakers, thereby ensuring that important contents are not filtered off by the MCU. Moreover, a plurality of private sessions can be established in a multipoint conference, so that participants can discuss different issues privately.

In another embodiment of the present invention, the objective of establishing a private session via multiple audio channels is achieved. The key difference between this embodiment and the above embodiment is that, in this embodiment, audio code streams of the original multipoint conference and the private session are respectively transmitted in multiple audio channels, rather than being transmitted through audio mixing.

Among the current protocols supporting a multipoint conference, most of the protocols support the transmission of audio code streams of the conference via multiple audio channels. For example, advanced audio coding-low delay (AAC-LD) protocol and some sub-protocols in motion picture expert group (MPEG) protocol suite support the transmission of voices via at least two audio channels, so as to achieve stereo transmission, thereby reducing the voice distortion, and the audio channels are all bi-directional. In a specific implementation, at least two audio channels are configured between a participant and an MCU: one audio channel is adapted to transmit audio code streams of a left audio channel, one audio channel is adapted to transmit audio code streams of a right audio channel, and an additional audio channel may further be configured to transmit a background sound.

In the conventional art, multiple audio channels are adapted to transmit an audio code stream, so as to realize a stereophonic function. This embodiment makes an improvement on the conventional art, i.e., one audio channel is adapted to transmit the content of a private session after the private session is established, and contents transmitted via the other audio channels remain unchanged. For example, the left audio channel is adapted to transmit the private session, and the right audio channel is adapted to transmit the session of the original multipoint conference, so that the private session participants may hear the private session via one audio channel, and hear the session of the multipoint conference via the other audio channel. The topological structure of the conference shown in FIG. 1 is still taken as an example. If a session is to be established between the participants C and D, the participants C and D and the MCU must all support the multi-channel voice processing. In a specific implementation, the following steps are performed.

1. An ordinary multipoint conference is held.

2. The participant C sends a private session establishment request to the MCU via a conference terminal thereof. The request may carry private session participant IDs, a session type of the session to be established, and a number of an audio channel selected for transmitting private session audio code streams of a private session initiator.

3. The MCU receives the private session establishment request, records the private session participant IDs, the session type, and the audio channel number, and forwards the request to the participant D according to the private session participant IDs, so as to query whether D agrees to establish the private session with C or not. The forwarded request message may carry an ID of the participant C, and the session type of the session to be established.

4. A conference terminal of the participant D returns a response message about agreeing to establish the session to the MCU. The message may carry an ID of the participant D, a session type of the session agreed to be established, and a number of an audio channel selected for transmitting the private session, and the ID of the participant C. The response message may not carry the number of the audio channel selected for transmitting private session audio code streams of the participant D, and instead, the MCU assigns an audio channel number to the participant D.

5. The MCU receives the response message, forwards the response message to the conference terminal of the participant C, records corresponding relations between the audio channels selected by C and D and the sessions, configures the audio channels, and adopts the selected audio channels to forward audio code streams between C and D.

6. The private session participants C and D conduct the session via the selected audio channels.

If a private session participant intends to terminate the private session, the following steps are performed.

7. Assuming that the participant C intends to terminate the private session, the participant C sends a request message for terminating the private session to the MCU. The message may carry IDs of participants of the private session to be terminated, and numbers of audio channels occupied by the private session to be terminated.

8. The MCU receives the request message for terminating the private session, forwards the request message to the participant D, and meanwhile restores the audio channels occupied by the private session to continue transmitting the content of the original multipoint conference.

Figure 5:
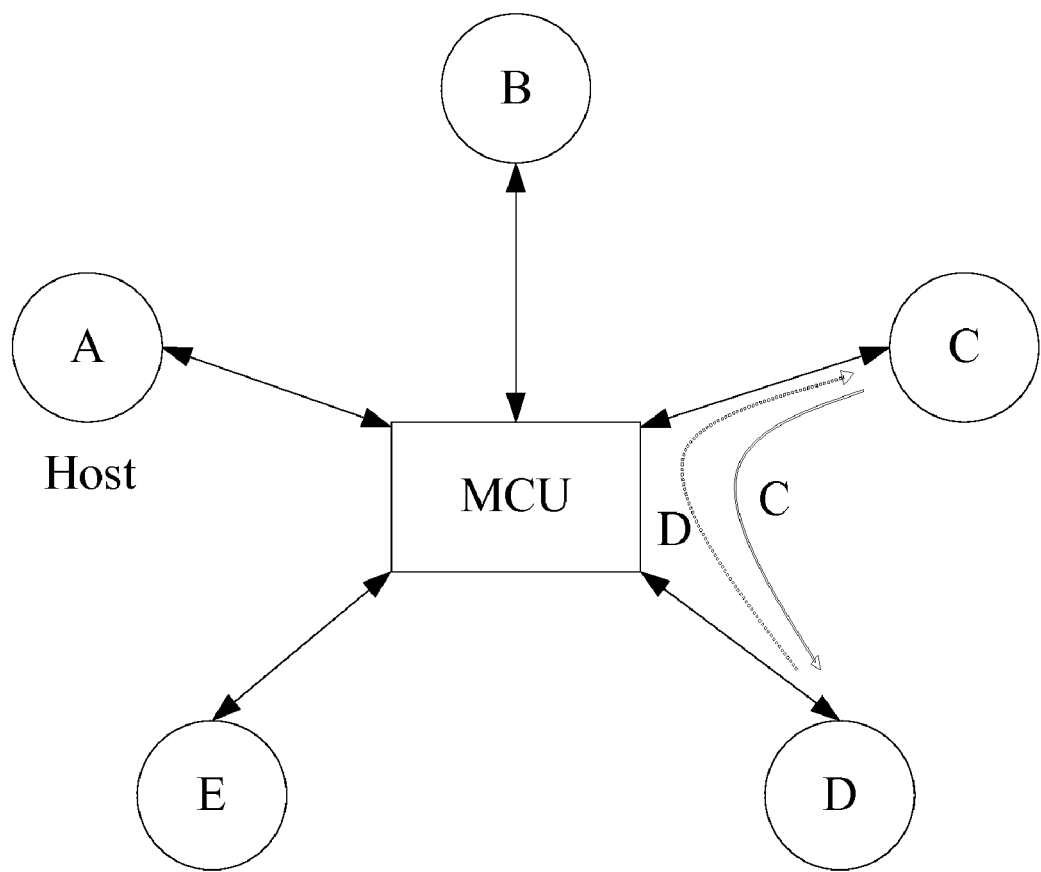
FIG. 5 is a schematic view of a principle of transmitting a private session via multiple audio channels according to an embodiment of the present invention.

The principle of transmitting a private session via multiple audio channels is as shown in FIG. 5. For the participants not involved in the private session, audio code streams thereof are still transmitted through audio mixing. This embodiment may also be extended. For example, it is assumed that both C and the MCU support the transmission via multiple audio channels, but D does not support the transmission via multiple audio channels. And the MCU may respectively process audio code streams sent to C and D. As for the code streams to be sent to C, the MCU sends the code streams via an audio channel selected by C according to the corresponding relation between the sessions and the audio channels recorded when the private session is established; and as for the code streams to be sent to D, the MCU mixes the code streams according to the audio mixing table, and then sends the mixed code streams.

In this embodiment, the audio code streams of the multipoint conference and the private session are respectively transmitted via multiple audio channels. Thus, it is realized that the participants have a private session while normally hearing the content of the original multipoint conference, and the content of the private session cannot be heard by those who do not participate in the private session.

By combining the manner of realizing a private session through multiple audio channels with the manner of realizing a private session through audio mixing, the embodiments of the present invention has a wider range of applications, and a private session can be conducted more flexibly according to different applications.

In an embodiment of the present invention, if the multipoint conference supports video calls among participants, when it intends to realize a private session, the audio code streams may be processed as described above, and video code streams may be processed in the following two different manners.

In one manner, after the private session is established, the MCU only forwards video code streams of the private session for the private session participants. Taking the topological structure of the conference shown in FIG. 1 as an example, after the private session has been established between the participants C and D, the MCU merely forwards video code streams of D to C, and forwards video code streams of C to D. Thus, C and D can only see images of the counterparts on the conference terminals thereof, but cannot see the other participants in the original multipoint conference.

In the other manner, different video code streams are transmitted in different video channels. An exiting protocol, for example, H.239 protocol, supports dual-channel transmission of video code streams by the MCU, which realizes the transmission of different video code streams in two different video channels. For example, one channel is adapted to transmit images of a speaker, and the other channel is adapted to transmit PowerPoint slides about the content of the conference. The two video channels are respectively referred to as a primary stream channel and a secondary stream channel. The primary stream channel is adapted to transmit images of the speaker, and the secondary stream channel is adapted to transmit the video of the content associated with the conference. In this embodiment of the present invention, the secondary stream channel is adapted to transmit images of speakers in the private session, and the implementation process thereof is similar to that of the audio code streams. Particularly, C sends a channel number of a secondary stream channel to the MCU through a request message; D sends a channel number of a secondary stream channel to the MCU through a response message; and after the private session is successfully established, video code streams of the private session are transmitted via the secondary stream channels.

Definitely, the embodiments of the present invention are not limited to transmitting video code streams of the private session in the secondary stream channels, but video code streams of the private session may also be transmitted via primary stream channels, which may be implemented similarly.

Likewise, the above two manners may also be combined. As for different private session participants, video code streams may be transmitted in different manners. For example, merely images of D are transmitted to C, and images of C are transmitted to D via a secondary stream channel.

Through the above two manners for transmitting video code streams, participants of the private session not only can hear voices of the counterparts, but also can see images of the counterparts during the private session.

Figure 6:
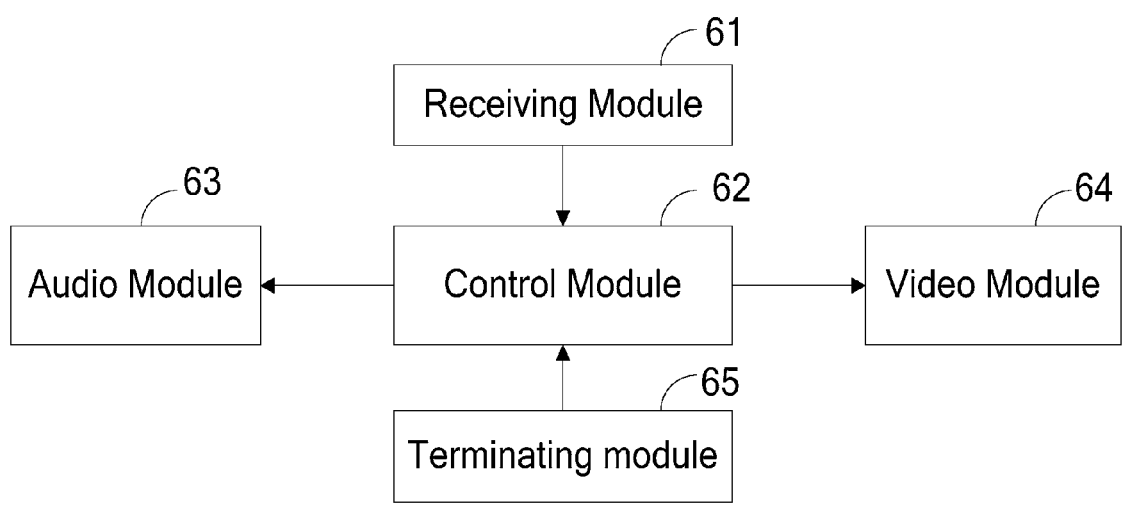
FIG. 6 is a structural view of a device for realizing a private session in a multipoint conference according to an embodiment of the present invention.

FIG. 6 is a structural view of a device for realizing a private session in a multipoint conference according to an embodiment of the present invention. The device includes a receiving module 61 and a control module 62.

The receiving module 61 is adapted to receive a private session establishment request carrying private session participant IDs sent by a private session initiator, and parse the received private session establishment request.

The control module 62 is adapted to establish a private session according to the private session establishment request parsed by the receiving module 61, and send audio code streams of private session participants corresponding to the private session participant IDs.

The device may further include an audio module 63.

The audio module 63 is adapted to transmit private session audio code streams in audio channels corresponding to the private session audio code streams, and transmit audio code streams of a multipoint conference in audio channels other than the audio channels corresponding to the private session audio code streams under the control of the control module 62.

In addition, the device may further include a video module 64.

The video module 64 is adapted to transmit video code streams of participants in a video channel under the control of the control module 62.

Alternatively, the video module 64 is adapted to transmit video code streams of multipoint conference participants and video code streams of the private session participants in different video channels respectively under the control of the control module 62.

In addition, when a private session participant intends to terminate the private session, the device may further include a terminating module 65.

The terminating module 65 is adapted to send a request message for terminating the private session to the control module 62. And the request message carries private session participant IDs and a session ID.

The control module 62 is adapted to receive the request message, recover an audio mixing table when the private session is not established, and forward the request message to the other private session participants.

The device can realize a private session without affecting the normal process of listening to the content of the original multipoint conference, and the content of the private session cannot be heard by those who do not participate in the private session.

The objectives, technical solutions, and beneficial effects of the present invention have been described in further detail through the above specific embodiments. It should be understood that the above descriptions are merely preferred embodiments of the present invention, but not intended to limit the scope of the present invention. Any modification, equivalent replacement, or improvement made without departing from the spirit and principle of the present invention should fall within the scope of the present invention.

What is claimed is:

1. A method for realizing a private session in a multipoint conference, comprising:
   receiving, by a multipoint control unit (MCU), a private session establishment request, wherein the private session establishment request carries private session participant identifiers (IDs);
   establishing, by the MCU, a private session according to the private session establishment request;
   mixing, by the MCU, audio code streams of private session participants according to the private session participant IDs; and
   sending, by the MCU, the mixed audio code streams to the private session participants, and prohibiting the mixed audio code streams of the private session participants from being sent to those not participating in the private session,
   presetting priority levels of all participants of the multipoint conference;
   wherein the mixing of the audio code streams of the private session participants further comprises:
      mixing, by the MCU, audio code streams of participants with high priority levels; and
      filtering off audio code streams of participants with low priority levels.

2. The method according to claim 1, wherein the private session establishment request further carries a session type and a session ID; and
   the establishing the private session further comprises:
   receiving, by the MCU, the private session establishment request; recording the session type, the session ID, and the private session participant IDs carried in the private session establishment request; and sending the private session establishment request to private session participants except the private session initiator according to the private session participant IDs;
   returning, by the private session participants except the private session initiator, a response message about agreeing to establish the private session to the MCU, after the private session participants except the private session initiator agree to establish the private session; and
   receiving, by the MCU, the response message, exclusively mixing audio code streams of the private session participants to obtain an audio mixing table, and setting senders and receivers of the audio code streams in the audio mixing table, so as to finish establishing the private session.

3. The method according to claim 1, wherein the private session establishment request further carries a session type and a number of an audio channel adapted to transmit private session audio code streams of the private session initiator; and
   the establishing the private session further comprises:
   receiving, by the MCU, the private session establishment request; recording the private session participant IDs, the session type, and the number of the audio channel; and sending the private session establishment request to private session participants except the private session initiator according to the private session participant IDs;
   sending, by the private session participants except the private session initiator, a response message about agreeing to establish the private session to the MCU, after the private session participants except the private session initiator agree to establish the private session; wherein the response message carries a number of an audio channel adapted to transmit private session audio code streams of the private session participants except the private session initiator; and receiving, by the MCU, the response message, and recording the number of the audio channel carried in the response message, so as to finish establishing the private session.

4. The method according to claim 3, wherein the sending the audio code streams of the private session participants corresponding to the private session participant IDs further comprises:

transmitting private session audio code streams in audio channels corresponding to the number of the audio channel carried in the private session establishment request and that carried in the response message.

5. The method according to claim 4, further comprising: transmitting audio code streams of the multipoint conference in audio channels other than the audio channels adapted to transmit the private session audio code streams.

6. The method according to claim 1, wherein the private session establishment request further carries a session type and a number of an audio channel adapted to transmit private session audio code streams of the private session initiator; and the establishing the private session further comprises:

receiving, by the MCU, the private session establishment request; recording the private session participant IDs, the session type, and the number of the audio channel adapted to transmit private session audio code streams of the private session initiator; and sending the private session establishment request to private session participants except the private session initiator according to the private session participant IDs;

returning, by the private session participants except the private session initiator, a response message about agreeing to establish the private session to the MCU, after the private session participants except the private session initiator agree to establish the private session; and receiving, by the MCU, the response message, and assigning a number of an audio channel adapted to transmit private session audio code streams of the private session participants except the private session initiator, so as to finish establishing the private session.

7. The method according to claim 6, wherein the sending the audio code streams of the private session participants corresponding to the private session participant IDs further comprises:

transmitting private session audio code streams in audio channels corresponding to the number of the audio channel carried in the private session establishment request and the number of the audio channel assigned by the MCU for the private session audio code streams of the private session participants except the private session initiator.

8. The method according to claim 7, further comprising: transmitting audio code streams of the multipoint conference in audio channels other than the audio channels adapted to transmit the private session audio code streams.

9. The method according to claim 1, wherein when video calls among participants is supported, the method further comprises:

forwarding, by the MCU, merely video code streams of the private session participants for the private session participants; or transmitting, by the MCU, video code streams of multipoint conference participants and video code streams of the private session participants in different video channels respectively.

10. The method according to claim 1, wherein when a private session participant intends to terminate the private session, the method further comprises:

sending a request message for terminating the private session to the MCU, wherein the request message carries the private session participant IDs and the session ID; and receiving, by the MCU, the request message, recovering an audio mixing table when the private session is not established, and forwarding the request message to the other private session participants.

11. A device for realizing a private session in a multipoint conference, comprising: a receiving module, a control module, and an audio module, wherein the receiving module is adapted to receive a private session establishment request carrying private session participant identifiers (IDs) sent by a private session initiator, and parse the received private session establishment request;

the control module is adapted to establish a private session according to the private session establishment request parsed by the receiving module, and send audio code streams of private session participants corresponding to the private session participant IDs; and the audio module is adapted to transmit private session audio code streams in audio channels corresponding to the private session audio code streams, and transmit audio code streams of the multipoint conference in audio channels other than the audio channels corresponding to the private session audio code streams under the control of the control module.

12. The device according to claim 11, further comprising: a video module, wherein the video module is adapted to transmit video code streams of the private session participants in a video channel under the control of the control module; or the video module is adapted to transmit video code streams of multipoint conference participants and video code streams of the private session participants in different video channels respectively under the control of the control module.

13. The device according to claim 11, wherein when a private session participant intends to terminate the private session, the device further comprises a terminating module;

the terminating module is adapted to send a request message for terminating the private session to the control module, wherein the request message carries private session participant IDs and a session ID; and the control module is adapted to receive the request message, recover an audio mixing table when the private session is not established, and forward the request message to the other private session participants.

* * * * *